United States Patent
Huang et al.

(10) Patent No.: US 9,942,014 B1
(45) Date of Patent: Apr. 10, 2018

(54) COOPERATIVE MULTIMEDIA COMMUNICATION METHOD AND SYSTEM THEREOF

(71) Applicant: NATIONAL TSING HUA UNIVERSITY, Hsinchu (TW)

(72) Inventors: Hao-Yun Huang, Hsinchu (TW); Yuh-Ren Tsai, Hsinchu (TW); Chin-Liang Wang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/465,921

(22) Filed: Mar. 22, 2017

(30) Foreign Application Priority Data

Oct. 12, 2016 (TW) .............................. 105132889 A

(51) Int. Cl.
*H04L 5/00* (2006.01)
*H04B 7/15* (2006.01)
*H04L 27/18* (2006.01)

(52) U.S. Cl.
CPC .............. *H04L 5/0035* (2013.01); *H04B 7/15* (2013.01); *H04L 5/006* (2013.01); *H04L 27/18* (2013.01)

(58) Field of Classification Search
CPC ............... H04L 27/0008; H04L 5/0044; H04L 27/2627; H04L 27/04; H04L 5/0032; H04L 65/607; H04L 27/20; H04L 5/0035
USPC ......................................... 375/260, 265, 295
See application file for complete search history.

(56) References Cited

U.S. PATENT DOCUMENTS

| | | | |
|---|---|---|---|
| 2007/0127576 A1* | 6/2007 | Henocq ................ | H04N 19/139 375/240.16 |
| 2008/0002767 A1* | 1/2008 | Schwarz .............. | H04N 19/147 375/240.12 |
| 2009/0042511 A1* | 2/2009 | Malladi ................... | H04L 5/023 455/62 |
| 2009/0097548 A1* | 4/2009 | Karczewicz ........... | H04N 19/61 375/240.03 |
| 2010/0260260 A1* | 10/2010 | Wiegand ................ | H04N 19/30 375/240.12 |
| 2011/0142106 A1* | 6/2011 | Lee ...................... | H04L 25/0226 375/219 |
| 2015/0067435 A1* | 3/2015 | Yerramalli ............ | H04L 1/0006 714/748 |
| 2016/0119807 A1* | 4/2016 | Sun ....................... | H04W 24/10 370/252 |
| 2017/0331662 A1* | 11/2017 | Sun ..................... | H04L 27/3411 |

* cited by examiner

*Primary Examiner* — Emmanuel Bayard
(74) *Attorney, Agent, or Firm* — Lin & Associates Intellectual Property, Inc.

(57) ABSTRACT

Provided is a cooperative multimedia communication system. The source node includes a first hierarchical modulation constellation diagram, modulates two data streams and transmits a first signal and a second signal. The relay node includes a protection-level-exchanging modulation and a second hierarchical modulation constellation diagram, modulates the second signal to generate a third signal and transmits the third signal. The destination node receives the first signal and the third signal and performs optimal decoding. The present disclosure designs a pair of optimal hierarchical constellation diagrams respectively for the source node and the relay node. Moreover, the present disclosure further provides a cooperative multimedia communication method.

12 Claims, 9 Drawing Sheets

COOPERATIVE MULTIMEDIA COMMUNICATION METHOD AND SYSTEM THEREOF

CROSS-REFERENCE TO RELATED APPLICATION

This application claims the priority of Taiwanese patent application No. 105132889, filed on Oct. 12, 2016, which is incorporated herewith by reference.

BACKGROUND OF THE INVENTION

1. Field of the Invention

The present disclosure relates to a cooperative multimedia communication method and a system thereof, more particularly to a cooperative multimedia communication method with performing protection-level-exchanging modulation in a relay node in a cooperative multimedia communication system.

2. The Prior Arts

In recent years, the development of wireless communication technology continues towards high transmission rate, high reliability, and high quality. Since the spectrum is limited and belongs to non-renewable resources, the development of wireless communication technology is closely related to the available spectrum. How to break through the bottleneck of wireless communication technology in a limited spectrum is one of the most important research issues in recent years. Therefore, the concept of smart cooperative networks was proposed, which consists of the cognitive radio (CR) technology and cooperative communications, to improve spectrum efficiency via the cognitive radio technology and to increase the system capacity and quality of communication via cooperative communications. The concept of cooperative communications is a promising technology for improving performance, which can mitigate the impact of channel fading and increase the diversity order of wireless transmission by the assistance of relay transmission. Therefore, the combination of CR technology and cooperative communications will be able to create a high efficient communication environment. In the next generation of wireless communication systems, cooperative communication can be expected to be an important application technology to enhance the spectrum efficiency and system capacity. The main concept of cooperative communication is the use of relay (R) nodes to assist the transmission of signals. FIG. 1 shows a cooperative communication infrastructure of prior art. As shown in FIG. 1, the cooperative communication infrastructure in the prior art includes a source (S) node 11, a relay node 13 and a destination (D) node 15. The transmission duration is divided into two time slots: (1) a first time slot T1: the source node 11 broadcasts signals to the relay node 13 and the destination node 15 at the same time; (2) a second time slot T2: the relay node 13 receives the signals transmitted by the source node 11 and transmits the signals to the destination node 15 after signal processing. The signals can be transmitted to the destination node 15 through a direct link (source-destination) and a relay link (source-relay-destination). As the signal transmission does not go through a single link, the effect of cooperative diversity can be achieved in a fading environment.

In general, the signal processing at the relay node 13 in the cooperative communication system can be classified into the following three approaches: (i) amplify-and-forward (AF), where the relay node 13 amplifies the signal received from the source node 11 and then forwards it to the destination node 15; (ii) decode-and forward (DF), where the relay node 13 decodes the signal received from the source node 11, re-modulates it and then forwards it to the destination node 15; and (iii) compress-and-forward (CF), where instead of decoding and re-modulating the received signal, the relay node transmits a quantized/compressed version of the signal. For the cooperative communication, half-duplex transmission is mainly used. The disadvantage is the requirement of an extra transmission time slot when compared with the traditional non-cooperative transmission, resulting in degradation in bandwidth efficiency. In recent years, many coding methods have been proposed to improve this shortcoming. For example, network coding (NC), hierarchical modulation (HM), and other technologies can improve the efficiency of channel transmission.

In the next-generation wireless communication systems, it is envisioned that multimedia broadcast services will gradually increase to become the major transmission mechanism. As we know, hierarchical modulation (HM) is commonly used for multimedia system; therefore how to combine cooperative communication and hierarchical modulation to enhance the quality of service of multimedia communication has become an important issue. Hierarchical modulation consists of multiple transmitted data streams with different degrees of transmission protection according to their importance such that constellation points on a constellation diagram show a non-uniform distribution (known as unequal error protection), where the most important information (knows as the base bits) can be recovered by all receivers, while the less important information (knows as the refinement bits) can be recovered only by the receivers in better reception conditions. In general, for multimedia communication, the base bits are necessary to maintain communication, while the refinement bits improve the quality of communication, but are not necessary. FIG. 2 illustrates a schematic diagram of a 4/16-QAM hierarchical modulation constellation diagram. As shown in FIG. 2, the 4/16-QAM hierarchical modulation includes four quadrants: first quadrant 21, second quadrant 23, third quadrant 25, and fourth quadrant 27. Each quadrant has four constellation points. Each constellation point includes four bits; that is, each constellation point includes two base bits and two refinement bits. Take the constellation point 211 as an example. The base/refinement bits are "00/10." The base bits can be viewed as those to be modulated to the virtual 4-QAM symbol with the four points at the centers in the four quadrants, while the refinement bits can be viewed as those to be modulated to the virtual 4-QAM symbol in one quadrant. Accordingly, the mappings of other constellation points can be obtained by the same concept. In the 4/16-QAM, The distances $2d_1$ and $2d_2$ denote the minimum distances between two constellation points in different quadrants and in the same quadrant, respectively; thus, in principle, $d_1$ is much larger than $d_2$ to ensure the transmission quality of the base bits. Correspondingly, the constellation priority parameter is defined as $\lambda=d_2/(d_1-d_2)$. The constellation priority parameter represents the relative message priorities, showing the protection ratio of the refinement bits to the base bits. In other words, the power resource endows to the refinement bits is proportional to $\lambda$.

In recent years, hierarchical modulation has been discussed for applications in cooperative communication system, there have been preliminary research results, including: (a) the bit error rate (BER) of the cooperative communication system based on hierarchical modulation is analyzed and a criterion for choosing constellation priority parameters was proposed to minimize the BER of the refinement bits while fulfilling the BER requirement of the base bits; (b) under the full-duplex mode, the upper bound of the symbol error rate (SER) is analyzed for finding the optimal constellation priority parameter to minimize the SER; (c) a threshold-based decision scheme, comparing the instantaneous received signal-to-noise ratio (SNR), was proposed for the relay node to determine whether it shall transmit both the base bits and refinement bits, transmit the base bits only or remain silent in the second time slot; (d) a simple relaying model is considered, the relay node only transmits the refinement bits to the destination node to improve the quality of the refinement bits (referred as the R-QPSK scheme); (e) the decision threshold optimization was investigated to maximize the cooperative diversity gain; and (f) a joint decoding method for hierarchical modulation was proposed for multi-relay nodes with orthogonal transmission channels.

In the next generation of wireless communication systems, it is expected that the multimedia services will be gradually increased and become the main traffic flows. Therefore, how to use the concept of cooperative communication to enhance the benefits of multimedia broadcast transmission will be an important issue and has not been widely studied so far. In addition, how to combine cooperative communication with hierarchical modulation to enhance the quality of service of multimedia communication will also be an important issue. Based on the conventional cooperative communication method, both the source node and the relay node use the same constellation diagram for signal transmission (referred as the conventional method). Although the transmission of both the base bits and the refinement bits at a relay node can improve the reception performance, the degree of improvement is limited in terms of the refinement bits with low degree of protection. Accordingly, in another technique of the prior art, only the refinement bits are transmitted to the destination node after the relay node is decoded so as to enhance the error rate of the refinement bits at the destination node. Even though this method is able to greatly improve the error rate of the refinement bits, the cooperative diversity gain for base bits is sacrificed.

In view of the above-mentioned deficiencies of the prior art, providing a scheme that not only can improve the error rate of the refinement bits of multimedia transmission but also preserve the cooperative diversity gain of the base bits is an important issue. In addition, the design of a set of optimal constellation diagrams and a set of optimal constellation priority parameters for the use at a source node and a relay node to achieve the best reception performance of multimedia communication is also an important issue.

SUMMARY OF THE INVENTION

In light of the foregoing drawbacks, the present disclosure provides a cooperative multimedia communication method, including the steps of: modulating base bits and refinement bits by using a first hierarchical modulation constellation diagram with different protection levels, and transmitting a first signal and a second signal at a source node; receiving and de-modulating the second signal, modulating the decoded base bits and refinement bits by using protection-level-exchanging modulation and a second hierarchical modulation constellation diagram to generate a third signal, and transmitting a third signal at a relay node; and receiving the first signal and the third signal and performing optimal decoding at a destination node.

In addition, the present disclosure further provides a cooperative multimedia communication system, including: a source node, having a first hierarchical modulation constellation diagram with different protection levels, modulating base bits and refinement bits and transmitting a first signal and a second signal; a relay node, having protection-level-exchanging modulation and a second hierarchical modulation constellation diagram with different protection levels, modulating the decoded base bits and refinement bits from the second signal to generate a third signal and transmitting the third signal; and a destination node, receiving the first signal and the third signal and performing optimal decoding.

BRIEF DESCRIPTION OF THE DRAWINGS

The present invention will be apparent to those skilled in the art by reading the following detailed description of a preferred exemplary embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate preferred exemplary embodiments of the invention and, together with the description, serve to explain the principles of the invention.

Figure 1:
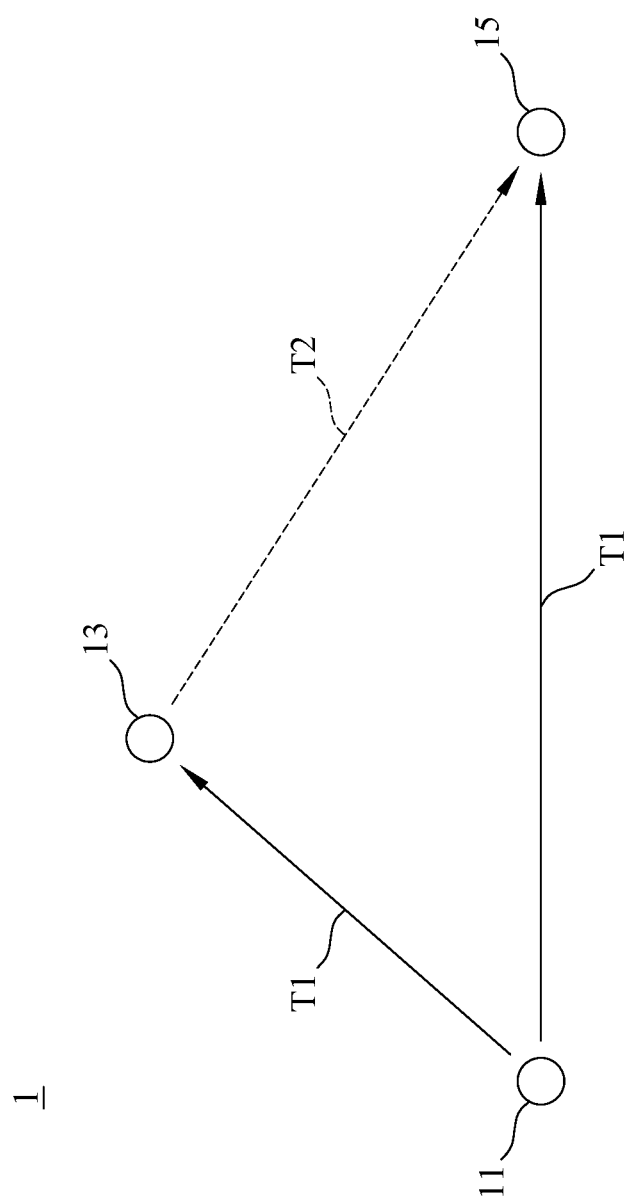
FIG. 1 is a schematic diagram of the cooperative communication infrastructure of the prior art.
Figure 2:
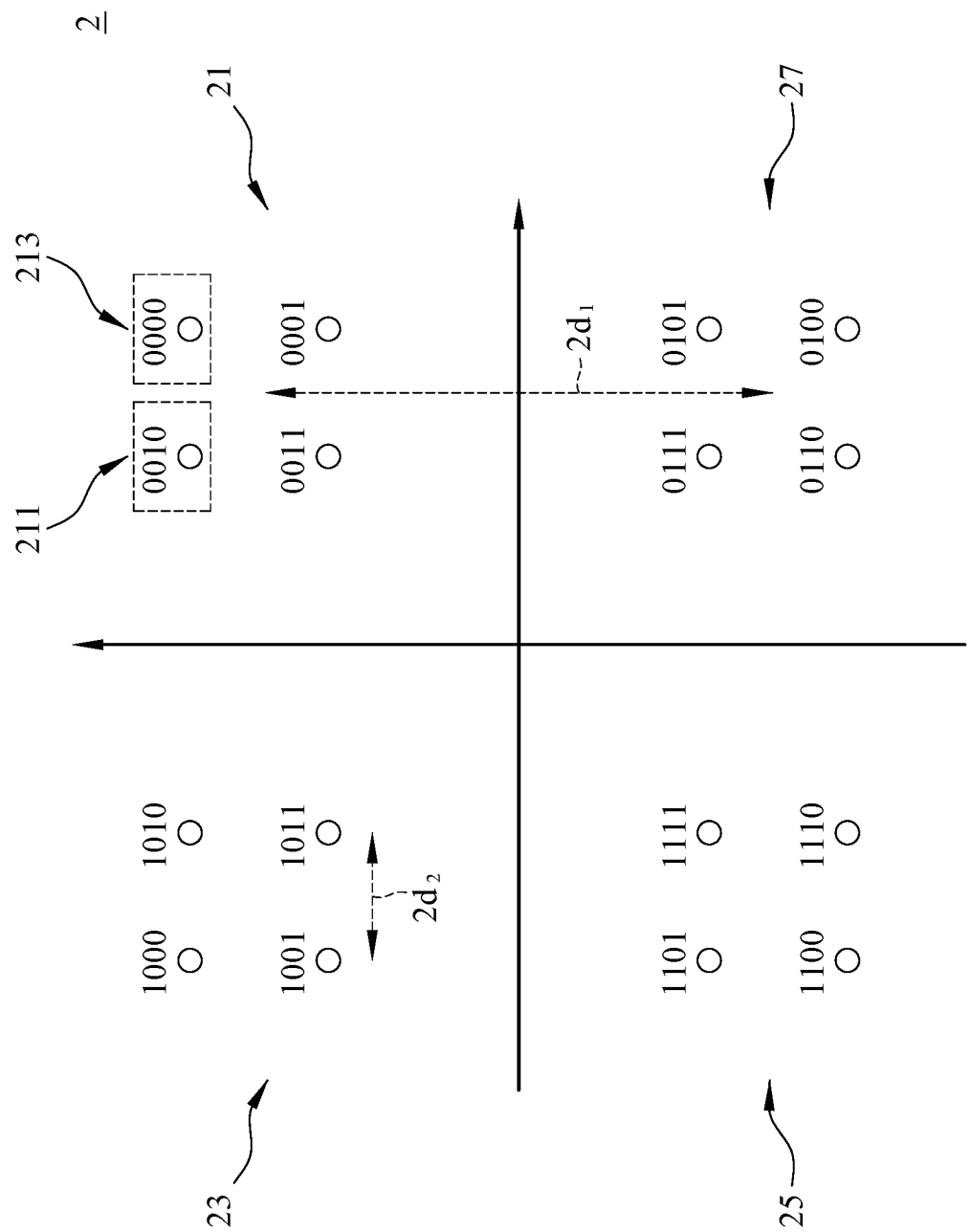
FIG. 2 is a schematic diagram of a 4/16-QAM hierarchical modulation constellation diagram.

The present disclosure provides a cooperative communication system based on hierarchical modulation as shown in FIG. 1. FIG. 1 shows a cooperative communication infrastructure. A source node 11 (denoted by S in the equation) may be considered a base station. A relay node 13 (denoted by R in the equation) may be considered a single or multiple nodes. In addition, a destination node 15 (denoted by D in the equation) may be considered a single receiver or multiple receivers. The second signal received at the relay node 13 in the first time slot T1 and the first signal received at the destination node 15 in the first time slot T1 can be expressed as $y_{SR}=\sqrt{E_S}h_{SR}x_S+n_{SR}$ and $y_{SD}=\sqrt{E_S}h_{SD}x_S+n_{SD}$, respectively, where $x_S$ is the signal transmitted from the source node 11; $y_{SR}$ and $y_{SD}$ are the signals received at the relay node 13 and the destination node 15, respectively; $E_S$ is the transmitted symbol energy from the source node 11; $h_{SR}$ and $h_{SD}$ are the channel coefficients of the S→R and S→D link, respectively; and $n_{SR}$ and $n_{SD}$ are the channel noise received at the relay node 13 and the destination node 15, respectively. Assuming that the decode-and-forward relaying protocol is used, the relay node 13 receives and decodes the second signal and checks the correctness of the decoded data. If the decoded data is correct, the relay node 13 re-modulates base bits and refinement bits to generate a third signal and transmits the third signal to the destination node 15 in the second time slot. On the contrary, if the decoded data is incorrect, the relay node 13 does not transmit any signal in the second time slot. In the second time slot T2, the third signal received at the destination node 15 can be expressed as $y_{RD}=\sqrt{E_R}h_{RD}x_R+n_{RD}$, where $x_R$ is the signal transmitted from the relay node 13; $y_{RD}$ is the signal received by the destination node 15 from the relay node 13; $E_R$ is the transmitted symbol energy from the relay node 13; $h_{RD}$ is the channel coefficient of the R→D link; and $n_{RD}$ is the channel noise received at the destination node 15. As such, at the destination node 15, based on the signals received in the two time slots, a combining technique is incorporated with the maximum likelihood (ML) detector to decode the base bits and the refinement bits.

In other words, according to an exemplary embodiment of the present disclosure, the cooperative multimedia communication system of the present disclosure includes: a source node 11, having a first hierarchical modulation constellation diagram with different protection levels, modulating base bits and refinement bits and transmitting a first signal and a second signal; a relay node 13, having protection-level-exchanging modulation and a second hierarchical modulation constellation diagram with different protection levels, modulating the decoded base bits and refinement bits from the second signal to generate a third signal and transmitting the third signal; and a destination node 15, receiving the first signal and the third signal and performing optimal decoding.

According to an exemplary embodiment of the present disclosure, the numbers of the relay node 13 and the destination node 15 may be plural.

In order to improve the service quality of multimedia communication, it is necessary for the users with poor average signal quality to use the relay node 13 to improve the communication quality (that is, to improve the bit error rate (BER) of the refinement bits). Therefore, in order to achieve high-quality communication service, the present disclosure provides the concept of protection-level-exchanging modulation: after the relay node 13 successfully demodulates the signal transmitted from the source node 11, the protection level of base bits and the protection level of refinement bits are exchanged. In other words, modulation protection level of the refinement bits is increased, and modulation protection level of the base bits is decreased. Accordingly, the modulated signal with protection-level-exchanging modulation is transmitted to the destination node 15. The BER of the refinement bits can be improved greatly in accordance with the present disclosure. However, in the conventional cooperative communication researches based on hierarchical modulation, the relay node 13 modulates the decoded data using the constellation diagram the same as the constellation diagram used by the source node 11. Using the same constellation diagram at the relay node 13 and the source node 11 is not the best design for the multimedia communications.

Based on the concept of protection-level-exchanging modulation, how to design an optimal constellation diagram used at the relay node 13 is an important issue for improving the BER of the refinement bits at a destination node. According to cooperative communication researches, when the destination node 15 receives two signals from the source node 11 and the relay node 13, the upper bound of the pairwise error probability (PEP) of the refinement bits at the destination node 15 can be expressed as $$PEP^{(r)}(x_i \to x_j) \leq \frac{3}{\gamma_S\gamma_R\sigma_{SD}^2|x_{S_i}-x_{S_j}|^2\sigma_{RD}^2|x_{R_i}-x_{R_j}|^2},$$

where the superscript (r) denotes the refinement bits; $x_i$ is the data vector corresponding to the symbol signals $x_{S_i}$ (transmitted by the source node 11) and $x_{R_i}$ (transmitted by the relay node 13); $\gamma_S$ and $\gamma_R$ are the transmit signal-to-noise ratios at the source node 11 and the relay node 13, respectively; $\sigma_{SD}^2$ and $\sigma_{RD}^2$ are the channel variances corresponding to the S→D and R→D links, respectively; and $PEP^{(r)}(x_i \to x_j)$ denotes the PEP for the erroneous decision from the correct data vector $x_i$ to the error data vector $x_j$. By investigating the above equation, the PEP is inversely proportional to the product distance $|x_{S_i}-x_{S_j}|^2|x_{R_i}-x_{R_j}|^2$, which is the guideline for the design of the constellation mapping used at the relay node. In order to minimize the maximum PEP, the mappings with different refinement bits for two adjacent points in the source constellation should be allocated to two non-adjacent points in the relay constellation to increase the product distance.

In order to conform to the standards of present communication systems, the standard hierarchical modulation constellation diagram (conforming to the Gray mapping) is used at the source node. In order to optimize the BER of the refinement bits at the destination node, the product distance of two pairs of points having different data mapping in refinement bits, corresponding to two data vectors (e.g., $x_i$ and $x_j$), should be effectively enlarged in the constellation mappings used at the source node and the relay node. Moreover, the constellation diagram for the relay node must meet the basic concept of hierarchical modulation. Accordingly, the goal of the present disclosure is to effectively enlarge the product distances and to ensure that the minimum product distance of two pairs of points having different data mapping in refinement bits is maximized. According to the present disclosure, a first hierarchical modulation constellation diagram and a second hierarchical modulation constellation diagram are provided and are used by the source node 11 and the relay node 13, respectively. In the present disclosure, the 4/16 hierarchical modulation constellation diagram is used as an embodiment to illustrate the constellation diagram design, but is not limited to the constellation diagram used in this embodiment. Other hierarchical modulation constellation diagrams may also be used (such as 2/4-ASK, 4/16-QAM, 4/64-QAM, etc).

Figure 3:
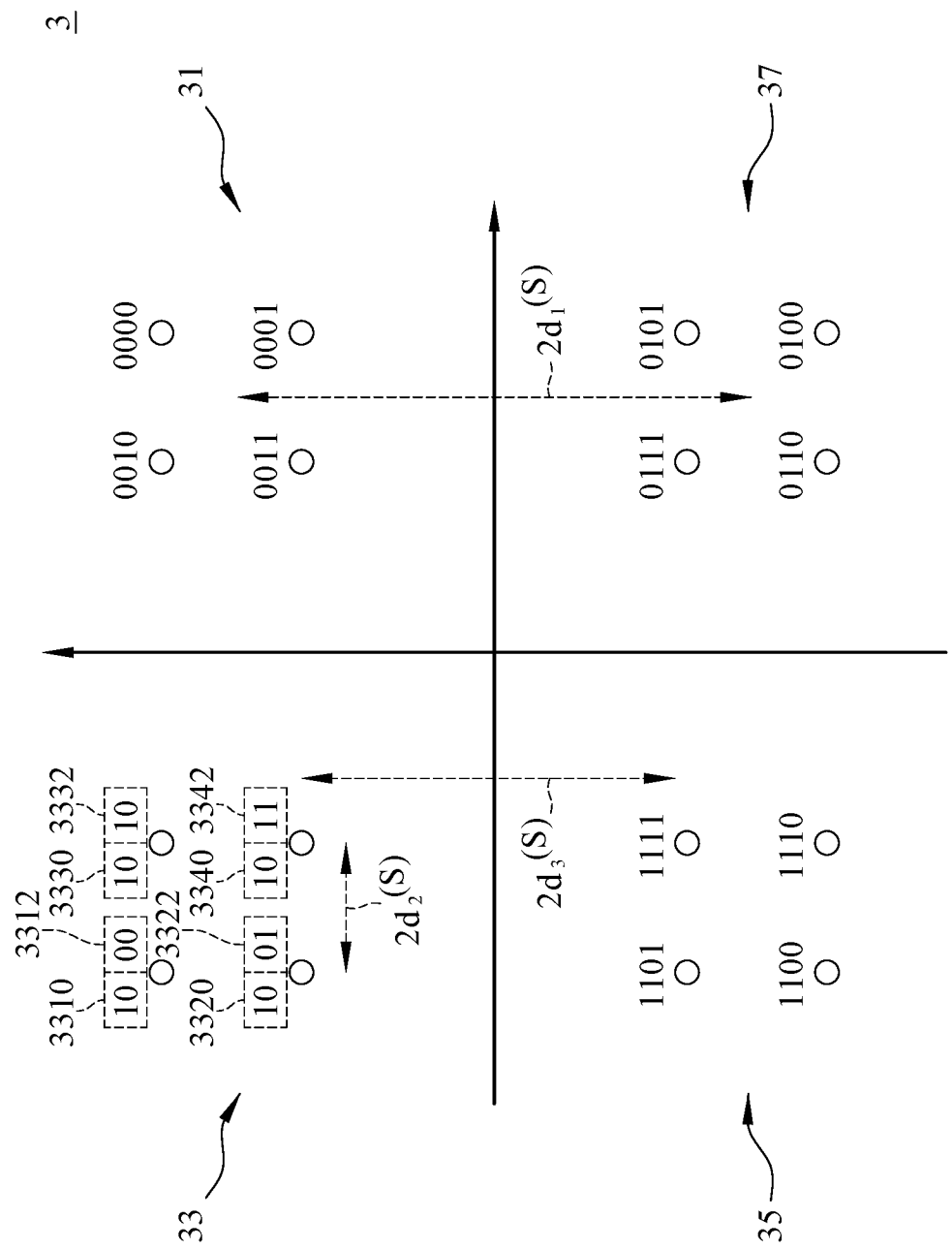
FIG. 3 is a schematic diagram illustrating a constellation diagram for a source node according to an exemplary embodiment of the present disclosure.

FIG. 3 shows a schematic diagram illustrating a constellation diagram for a source node according to an exemplary embodiment of the present disclosure. As shown in FIG. 3, the source node 11 uses a standard 4/16 hierarchical modulation constellation diagram 3 (conforming to the Gray mapping). The hierarchical modulation constellation diagram 3 includes four quadrants: first quadrant 31, second quadrant 33, third quadrant 35, and fourth quadrant 37. Each quadrant has four constellation points. Each constellation point includes four bits; that is, each constellation point includes two base bits and two refinement bits. The constellation points in the second quadrant 33 are taken as an example. The base bits 3310 are "10," the refinement bits 3312 are "00," the base bits 3320 are "10," the refinement bits 3322 are "01," the base bits 3330 are "10," the refinement bits 3332 are "10," the base bits 3340 are "10," and the refinement bits 3342 are "11." Similarly, the constellation points in other quadrants can be deduced.

Figure 4:
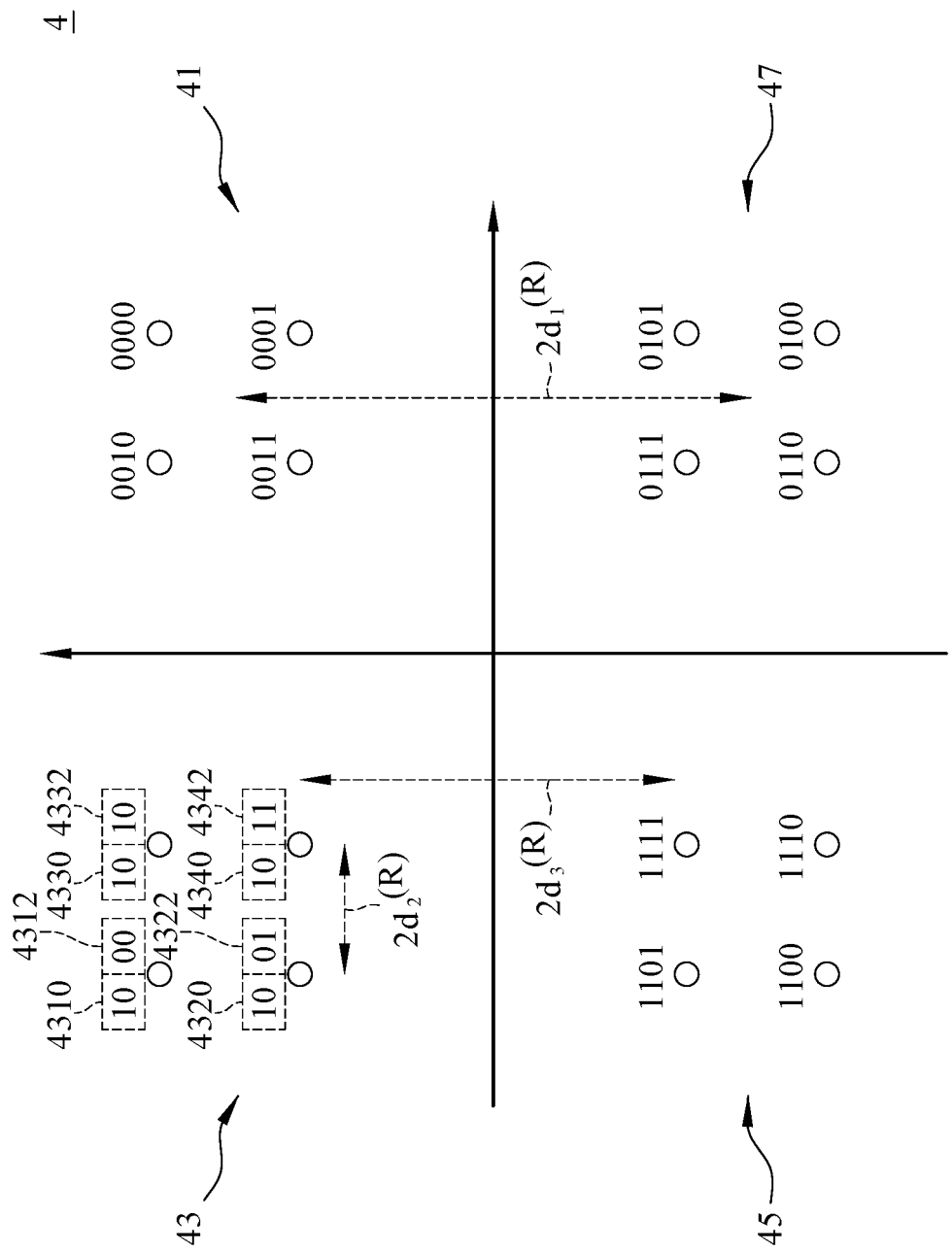
FIG. 4 is a schematic diagram illustrating a constellation diagram with protection-level-exchanging modulation for a relay node, with respect to the constellation diagram in FIG. 3, according to an exemplary embodiment of the present disclosure.

FIG. 4 shows a schematic diagram illustrating a hierarchical modulation constellation diagram with protection-level-exchanging modulation for a relay node according to an exemplary embodiment of the present disclosure. Referring to FIGS. 3 and 4, in the embodiment of the present disclosure, the relay node 13 uses a constellation diagram similar to the constellation diagram used by the source node 11, but the mappings of the two base bits and two refinement bits are exchanged in the two constellation diagrams. The hierarchical modulation constellation diagram 4 includes four quadrants: first quadrant 41, second quadrant 43, third quadrant 45, and fourth quadrant 47. Each quadrant has four constellation points. Each constellation point includes four bits; that is, each constellation point includes two base bits and two refinement bits. The constellation points in the second quadrant 43 are taken as an example. The refinement bits 4310 are "10," the base bits 4312 are "00," the refinement bits 4320 are "10," the base bits 4322 are "01," the refinement bits 4330 are "10," the base bits 4332 are "10," the refinement bits 4340 are "10," and the base bits 4342 are "11." Similarly, the constellation points in other quadrants can be deduced.

After the completion of protection-level-exchanging modulation (that is, the original mappings of the base bits are exchanged as the mappings of the refinement bits, and the original mappings of the refinement bits are exchanged as the mappings of the base bits), the product distance of two pairs of points having different data mapping in refinement bits in the constellation diagram used at the source node 11 (as shown in FIG. 3) and in the constellation diagram used at the relay node 13 (as shown in FIG. 4) is $|2d_2^{(S)}|^2|2d_3^{(R)}|^2$. For example, considering the two constellation points with the base/refinement bits "10/00" and "10/10," the two relative distances are $2d_2^{(S)}$ and $2d_3^{(R)}$ in the constellation diagram used at the source node (11) and the constellation diagram used at the relay node (13), respectively.

Figure 5:
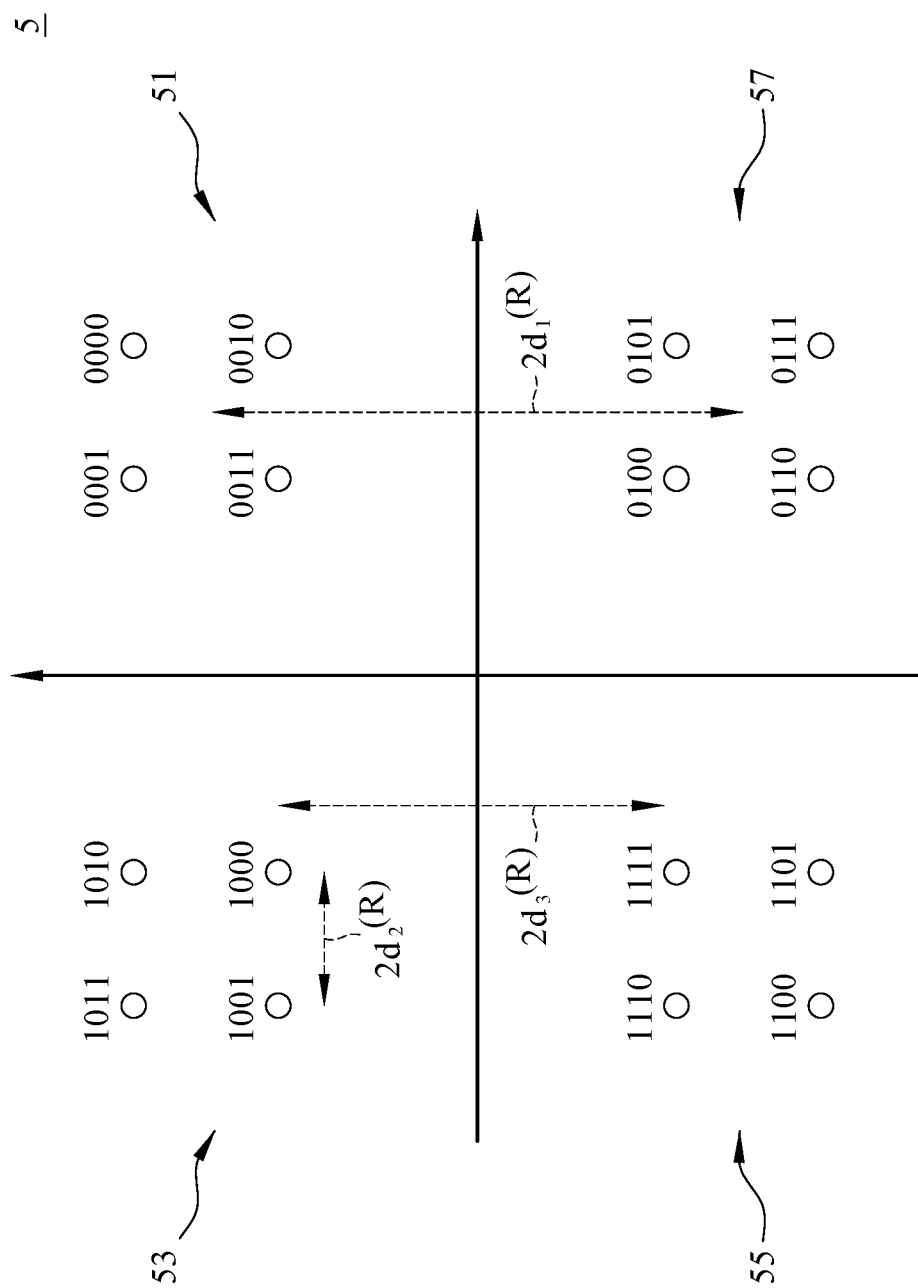
FIG. 5 is a schematic diagram illustrating an optimal constellation diagram for a relay node, with respect to the constellation diagram in FIG. 3, according to an exemplary embodiment of the present disclosure.

FIG. 5 shows a schematic diagram of an optimal constellation diagram (a second hierarchical modulation constellation diagram), with respect to the constellation diagram in FIG. 3, for a relay node according to an exemplary embodiment of the present disclosure. Referring to FIG. 5, the optimal hierarchical modulation constellation diagram 5, with respect to the constellation diagram in FIG. 3, includes four quadrants: first quadrant 51, second quadrant 53, third quadrant 55, and fourth quadrant 57. Each quadrant has four constellation points. Each constellation point includes four bits, two refinement bits and two base bits.

As expected, the designed optimal hierarchical modulation constellation diagram 5 is able to effectively enlarge the relative distances. For example, the distance of the two points having different data mapping in refinement bits (base bits/refinement bits "10/00" and "10/10") is enlarged to $2\sqrt{(d_2^{(R)}+d_3^{(R)})^2+d_2^{(R)2}}$ in the constellation used at the relay node (13). In comparison, the distance of the two points having different data mapping in refinement bits (base bits/refinement bits "10/00" and "10/10") is $2d_3^{(R)}$ in the hierarchical modulation constellation diagram 4; that is, the mappings with different refinement bits for two adjacent points at the source node 11 are now allocated to two points that are far apart at the relay node 13 to increase the product distance. Therefore, the BER of the refinement bits can be significantly improved, and the communication quality can also be greatly improved. According to an exemplary embodiment of the present disclosure, the constellation diagram of FIG. 3 and the constellation diagram of FIG. 5 are a pair of optimal constellation diagrams.

The objective of the present disclosure is to improve the BER of the refinement bits for overall service quality improvement. However, optimizing the constellation priority parameters based only on the BER of the refinement bits (or base bits) is not a valid approach. That is to say, the performance evaluation of the constellation propriety parameter optimization shall consider both the base bits and refinement bits jointly. Based on the combined BER (CB) concept, for $M_1/M_2$-QAM HM, the combined BER measure is given as $$P_{CB}(\lambda_S,\lambda_R)=\log_{M_2}(M_1)P_D^{(b)}(\lambda_S,\lambda_R)+\log_{M_2}(M_2/M_1)P_D^{(r)}(\lambda_S,\lambda_R)$$

where $P_D^{(b)}(\lambda_S,\lambda_R)$ and $P_D^{(r)}(\lambda_S,\lambda_R)$ are the BERs of the base bits and the refinement bits at the destination node 15; and $\lambda_S$ and $\lambda_R$ are the constellation priority parameters used at the source node and at the relay node, respectively. The BERs of different protection levels are weighted by the corresponding throughput. In the case of using 4/16-QAM hierarchical modulation, the weighting factors are $\log_{M_2}(M_1)=\log_{M_2}(M_2/M_1)=0.5$, implying that the base bits and refinement bits have the same importance. It is not a practical measure for multimedia communication.

In view of the above, to differentiate the importance of different protection levels, the present disclosure provides the weighted combined BER (WCB) measure for overall performance evaluation, which is defined as $$P_{WCB}(\lambda_S,\lambda_R)=w_1 P_D^{(b)}(\lambda_S,\lambda_R)+w_2 P_D^{(r)}(\lambda_S,\lambda_R),$$

where $w_1$ and $w_2$ denote the importance of the base bits and the refinement bits, respectively, and $0.5 \leq w_1 \leq 1$, $0 \leq w_2 \leq 0.5$ with the constraint $w_1+w_2=1$. Given a pair of importance coefficients $(w_1, w_2)$, the problem of constellation priority parameters optimization is stated as $$(\lambda_S^{opt}, \lambda_R^{opt})|_{w_1,w_2} = \arg\min_{0\leq\lambda_S\leq 1, 0\leq\lambda_R\leq 1} P_{WCB}(\lambda_S, \lambda_R)\Big|_{w_1,w_2}.$$

The optimal modulation parameters $(\lambda_S^{opt},\lambda_R^{opt})$ can be computed numerically under a pair of importance coefficients $(w_1, w_2)$ so as to enhance the system reception performance.

Figure 6:
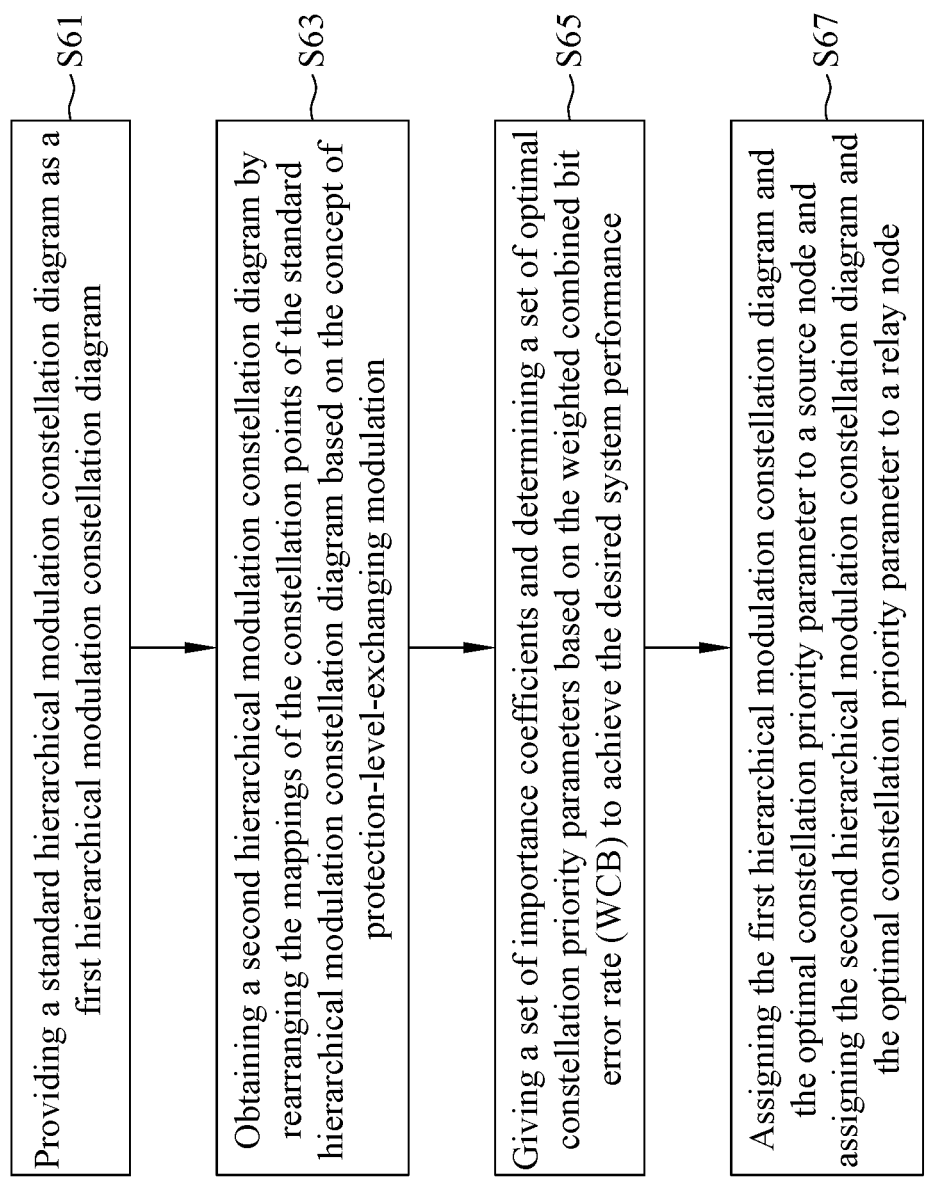
FIG. 6 is a flow chart of a cooperative multimedia communication method according to an exemplary embodiment of the present disclosure.

As shown in FIG. 6, the communication method in the cooperative multimedia system of the present disclosure includes the following steps S61-S67:

step S61: providing a standard hierarchical modulation constellation diagram as a first hierarchical modulation constellation diagram;

step S63: obtaining a second hierarchical modulation constellation diagram by rearranging the mappings of the constellation points of the standard hierarchical modulation constellation diagram based on the concept of protection-level-exchanging modulation;

step S65: giving a set of importance coefficients and determining a set of optimal constellation priority parameters based on the weighted combined bit error rate (WCB) to achieve the desired system performance; and step S67: assigning the first hierarchical modulation constellation diagram and the optimal constellation priority parameter to a source node and assigning the second hierarchical modulation constellation diagram and the optimal constellation priority parameter to a relay node.

Figure 7:
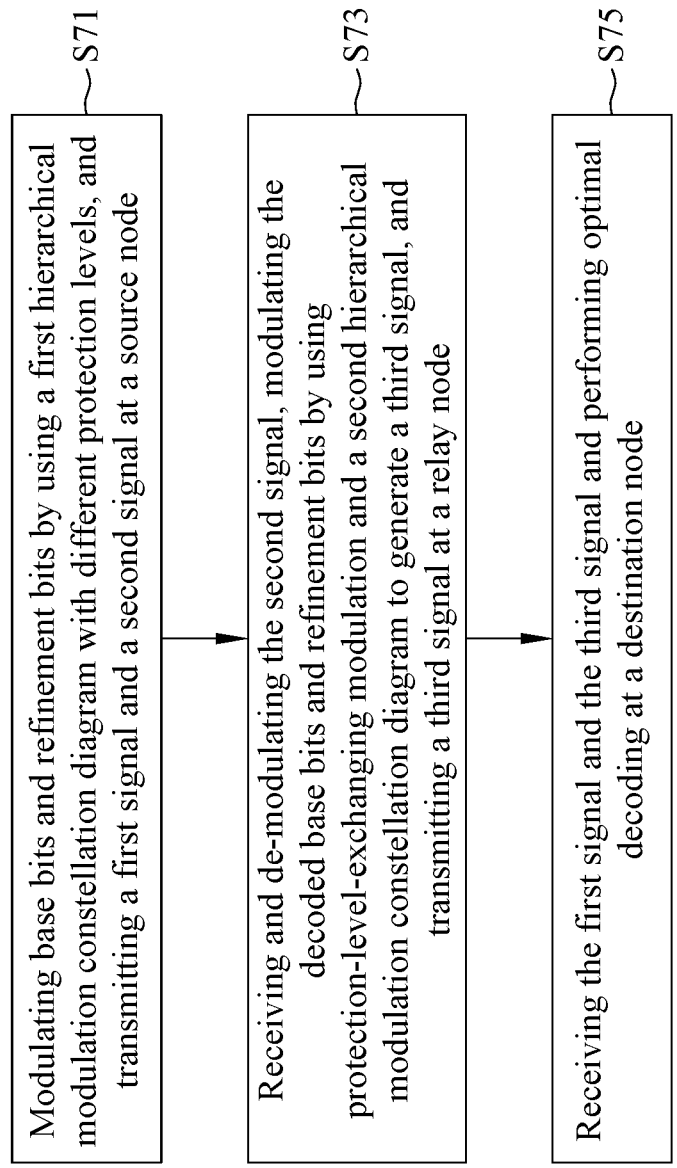
FIG. 7 shows another schematic diagram of a cooperative multimedia communication method according to another exemplary embodiment of the present disclosure.

Briefly, as shown in FIG. 7, the communication method in the cooperative multimedia system of the present disclosure includes the following steps S71-S75:

step S71: modulating base bits and refinement bits by using a first hierarchical modulation constellation diagram with different protection levels, and transmitting a first signal and a second signal at a source node;

step S73: receiving and de-modulating the second signal, modulating the decoded base bits and refinement bits by using protection-level-exchanging modulation and a second hierarchical modulation constellation diagram to generate a third signal, and transmitting a third signal at a relay node; and step S75: receiving the first signal and the third signal and performing optimal decoding at a destination node.

According to an exemplary embodiment of the present disclosure, the numbers of the relay node 13 and the destination node 15 may be plural.

According to an exemplary embodiment of the present disclosure, the first hierarchical modulation constellation diagram and the second hierarchical modulation constellation diagram may be any type of constellation diagrams such as 2/4-ASK, 4/16-QAM, 4/64-QAM, and so on.

Figure 8:
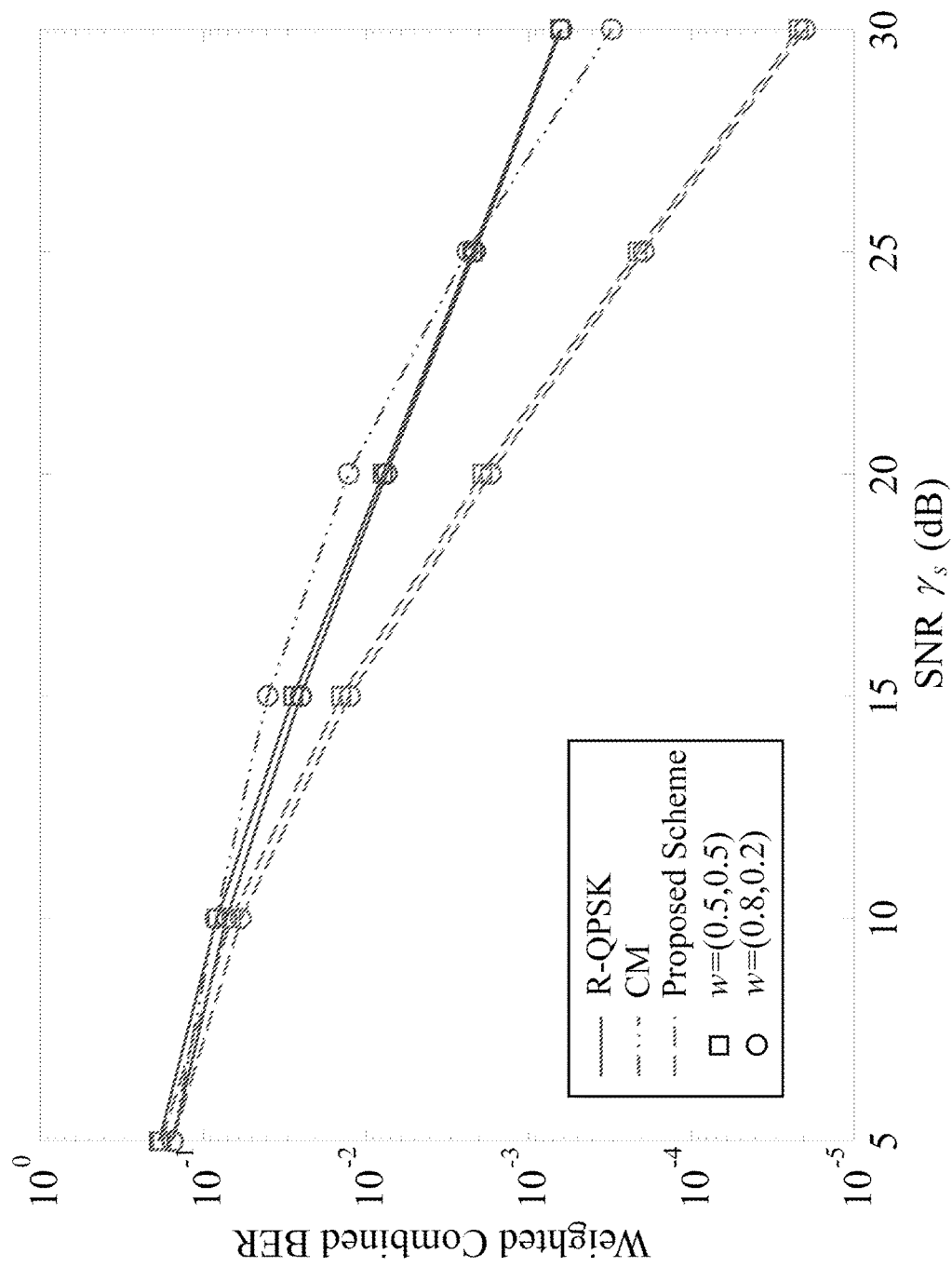
FIG. 8 is a graph illustrating a comparison of the present disclosure (proposed scheme) with R-QPSK and the conventional method (CM) according to an exemplary embodiment of the present disclosure.
Figure 9:
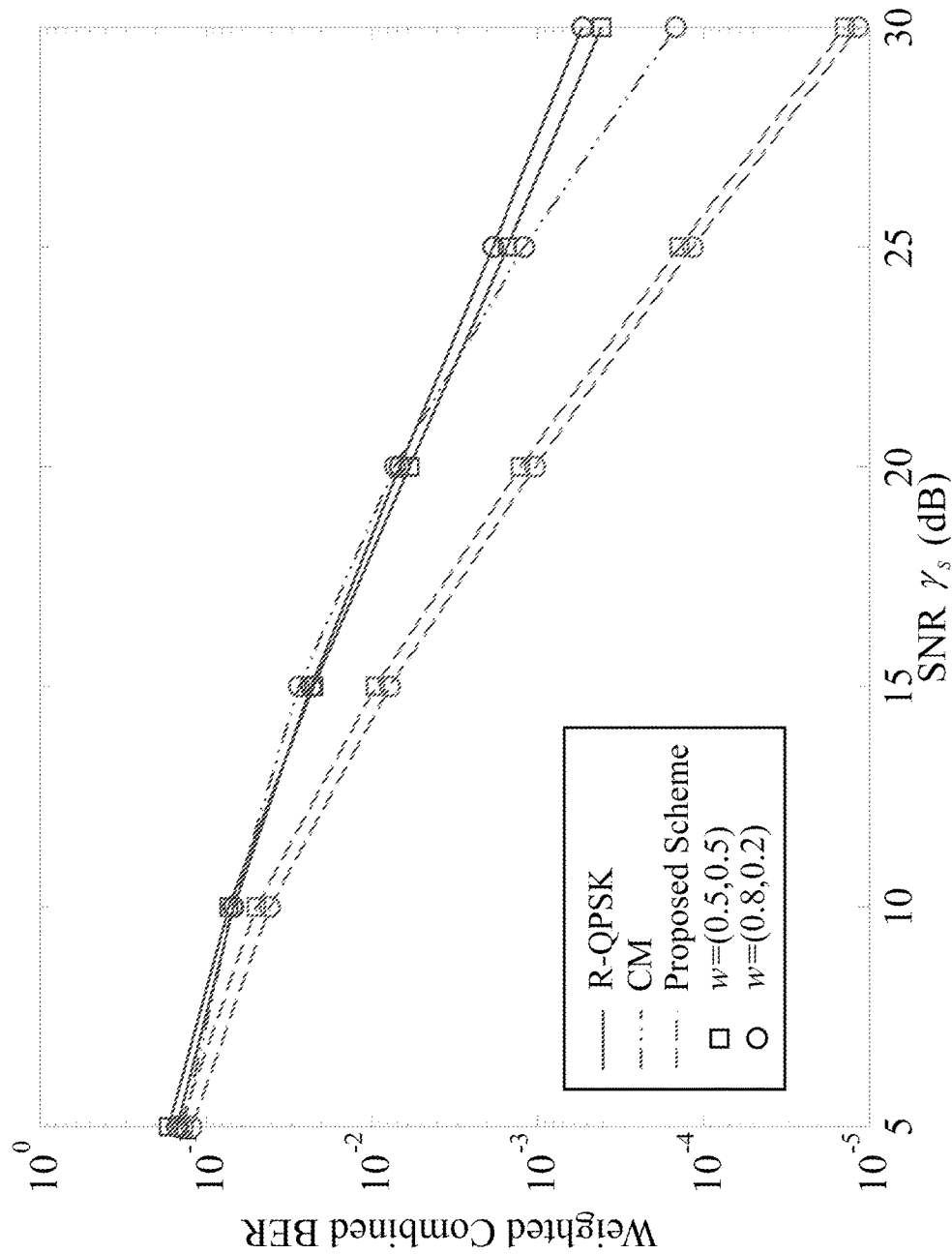
FIG. 9 is a graph illustrating a comparison of the present disclosure (proposed scheme) with R-QPSK and CM according to another exemplary embodiment of the present disclosure.

As shown in FIG. 8, a comparison of the present disclosure (proposed scheme) with R-QPSK and Conventional method (CM) under $(\sigma_{SD}^2, \sigma_{SR}^2, \sigma_{RD}^2)=(1,1,1)$ is provided. For the R-QPSK scheme, the relay node 13 transmits only the refinement bits by using QPSK modulation when the received signal is correctly decoded. The destination node 15 decodes the base bits based on the signal received in the first time slot T1, while the refinement bits are decoded based on the signal received in the second time slot T2. In addition, the CM is also used to compare with the present disclosure. In the CM, both the source node 11 and the relay node 13 use the same constellation diagram to modulate the signals. As shown in FIG. 8, the present disclosure can not only effectively improve the BER of the refinement bits but also maintain the cooperative diversity gain of the base bits. It can be seen from FIG. 8 that the present disclosure outperforms other methods. FIG. 9 shows a graph of a comparison of the present disclosure with R-QPSK and CM under $(\sigma_{SD}, \sigma_{SR}^2, \sigma_{RD}^2)=(1,1,10)$. It can also be seen from FIG. 9 that the present disclosure outperforms other methods.

Based on the foregoing, the present disclosure provides a cooperative multimedia communication system and a method thereof. By using protection-level-exchanging modulation and rearranging of constellation mappings to produce a second hierarchical modulation constellation diagram for the relay node, the BER of refinement bits received by the destination node can be greatly reduced; that is, the communication quality is effectively improved.

In describing the representative examples of the present disclosure, the present disclosure provides a cooperative multimedia communication method and system thereof. The method is defined as a sequence of steps. However, the method should not be limited to the particular order of steps described. Those skilled in the art can understand that other sequences of steps are also possible. Accordingly, the sequence of the steps set forth in the present disclosure should not be limited to the scope of the claims. In addition, the scope of the present disclosure relating to the method should not be limited to the effectiveness of the steps in the present sequence, and those skilled in the art may immediately understand that such sequences may be altered and remain within the spirit and scope of the present disclosure.

Although the present invention has been described with reference to the preferred exemplary embodiments thereof, it is apparent to those skilled in the art that a variety of modifications and changes may be made without departing from the scope of the present invention which is intended to be defined by the appended claims.

What is claimed is:

1. A cooperative multimedia communication method, comprising the steps of:
    modulating base bits and refinement bits by using a first hierarchical modulation constellation diagram with different protection levels, and transmitting a first signal and a second signal at a source node;
    receiving and de-modulating the second signal into decoded base bits and refinement bits, modulating the decoded base bits and refinement bits by using protection-level-exchanging modulation and a second hierarchical modulation constellation diagram to generate a third signal, and transmitting the third signal at a relay node; and
    receiving the first signal and the third signal and performing optimal decoding at a destination node.

2. The cooperative multimedia communication method of claim 1, further comprising the step of giving a set of importance coefficients and determining a set of optimal constellation priority parameters based on a weighted combined bit error rate (WCB) to achieve desired system performance.

3. The cooperative multimedia communication method of claim 1, wherein the protection-level-exchanging modulation of the relay node treats original base bits as refinement bits and treats original refinement bits as base bits for modulation.

4. The cooperative multimedia communication method of claim 1, wherein the second hierarchical modulation constellation diagram is obtained from the first hierarchical modulation constellation diagram via the protection-level-exchanging modulation and a constellation mapping rearrangement to maximize a minimum product distance for any two pairs of points having different data mapping in refinement bits in the constellation diagrams used at the source node and the relay node.

5. The cooperative multimedia communication method of claim 1, wherein the first hierarchical modulation constellation diagram and the second hierarchical modulation constellation diagram are any type of constellation diagrams.

6. The cooperative multimedia communication method of claim 1, wherein the numbers of the relay node and the destination node are plural.

7. A cooperative multimedia communication system, comprising:
    a source node, having a first hierarchical modulation constellation diagram with different protection levels, modulating base bits and refinement bits and transmitting a first signal and a second signal;
    a relay node, having protection-level-exchanging modulation and a second hierarchical modulation constellation diagram with different protection levels, receiving and de-modulating the second signal into decoded base bits and refinement bits, and modulating the decoded base bits and refinement bits to generate a third signal and transmitting the third signal; and a destination node, receiving the first signal and the third signal and performing optimal decoding.

8. The cooperative multimedia communication system of claim 7, wherein desired system performance is achieved by giving a set of importance coefficients and determining a set of optimal constellation priority parameters based on a weighted combined bit error rate (WCB).

9. The cooperative multimedia communication system of claim 7, wherein the protection-level-exchanging modulation of the relay node treats original base bits as refinement bits and treats original refinement bits as base bits for modulation.

10. The cooperative multimedia communication system of claim 7, wherein the second hierarchical modulation constellation diagram is obtained from the first hierarchical modulation constellation diagram via the protection-level-exchanging modulation and a constellation mapping rearrangement to maximize a minimum product distance for any two pairs of points having different data mapping in refinement bits in the constellation diagrams used at the source node and the relay node.

11. The cooperative multimedia communication system of claim 7, wherein the first hierarchical modulation constellation diagram and the second hierarchical modulation constellation diagram are any type of constellation diagrams.

12. The cooperative multimedia communication system of claim 7, wherein the numbers of the relay node and the destination node are plural.

\* \* \* \* \*